Jan. 19, 1937.  E. C. LONG  2,068,341
PISTON
Filed Nov. 22, 1919
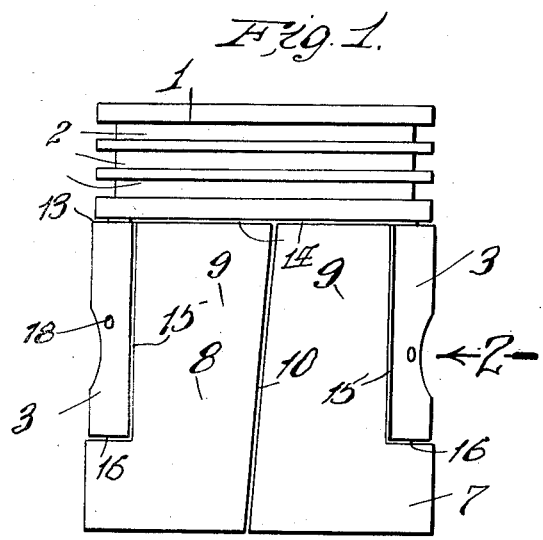
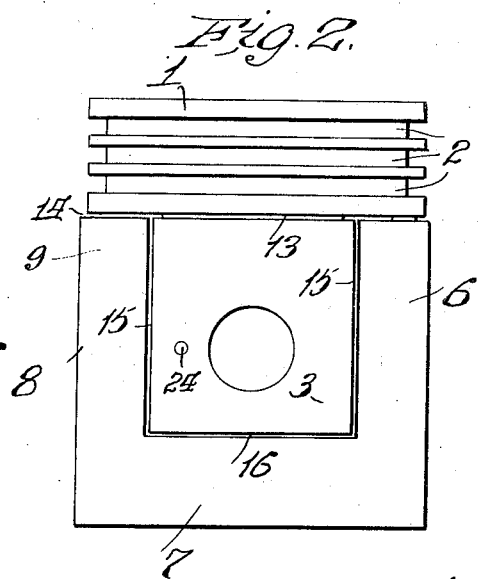
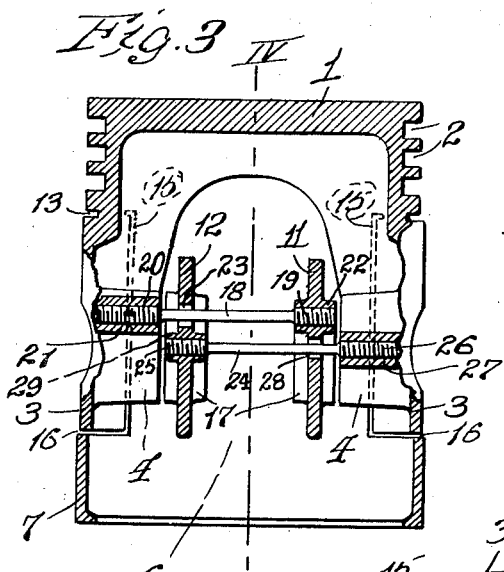
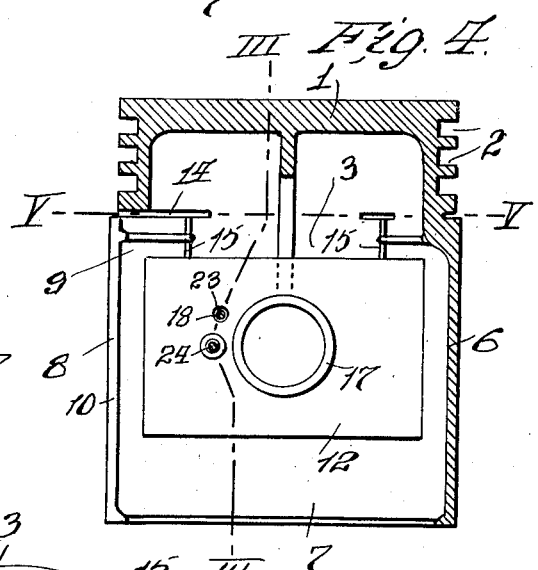
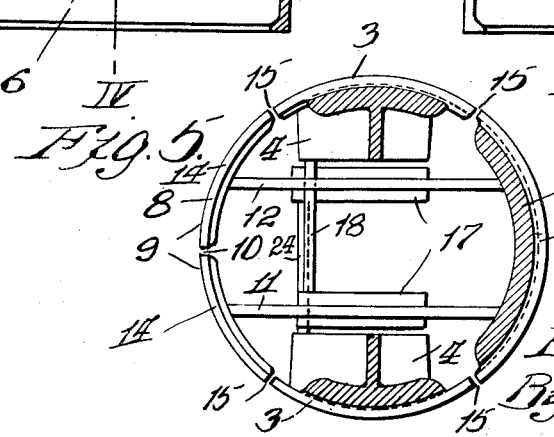
Inventor:
Elmer C. Long
By L. G. Fletcher
atty.

Patented Jan. 19, 1937

2,068,341

UNITED STATES PATENT OFFICE 2,068,341

PISTON

Elmer C. Long, Quincy, Ill., assignor, by mesne assignments, to Security Trust Company, Detroit, Mich., a corporation of Michigan Application November 22, 1919, Serial No. 339,892

26 Claims. (Cl. 309—11)

The main object of this invention is to provide a piston for internal combustion motors with certain improvements for eliminating the heretofore excess expansion of the cylinder bearing portion or skirt of the piston.

Another object is to provide a piston with improvements of a character capable of permitting a proper fitting relation with minimum clearance of the piston skirt in the cylinder of a motor being established at the time the piston and cylinder are mounted together and so that this "cold" fitting relation with minimum clearance will be maintained at all times during the working of the motor while the piston and its cylinder are under either a minimum or a maximum amount of expansion.

Other and further objects will appear in the specification and be specifically pointed out in the appended claims reference being had to the accompanying drawing exemplifying the invention, and in which, Figure 1 is a side elevation of this improved piston.

Figure 2 is a side elevation of Fig. 1, taken in the direction of the arrow 2.

Figure 3 is a vertical section taken approximately on the line III—III of Fig. 4.

Figure 4 is a vertical section taken on the line IV—IV of Fig. 3.

Figure 5 is a horizontal section taken on the line V—V of Fig. 4.

Referring to the drawing, this improved piston comprises a solid end portion or head 1 having the piston ring recesses 2, and depending from said solid end 1 is a pair of opposing wrist pin bearing supports 3 which carry the inwardly extending horizontally arranged wrist pin bearings or bosses 4. Extending from the solid end 1 is a cylinder bearing portion 6, said portion 6 at its lower end terminating into a circular portion 7, and oppositely disposed from the portion 6 is a cylinder bearing portion 8, which comprises a pair of upwardly extending portions 9, said portions 9 being divided by angular slots 10, said portions 6, 7, 8 and 9 comprising the skirt portion of the piston. Formed integral with one of the portions 9 and with the portion 6 is a member 11 and there being a similar member 12 extending from the other portion 9 to the portions 6 across the hollow of the piston.

In the present way of manufacturing this improved piston, the periphery thereof is cast or made solid, after which the periphery is slotted in order to provide the peripheral wrist pin bearing supports 3 and portions 6, 7, 8 and 9 of the skirt of the piston. In slotting the piston, an annular cutting such as is designated by 13 is provided, said cutting at 14 and across the width of the portions 9 being made entirely through the thickness of the peripheral wall, the through cutting 14 also being carried out in the vertical slots 15 and adjoining horizontal slots 16, the respective pairs of vertical slots 15 and adjoining slots 16 providing the supports 3, said slots 15 and 16 as well as the slot 14 providing the skirt portion of the piston with the resiliently flexible part 7, 8 or 9.

From the aforesaid description relative to the slots, it will be noted that the supports 3 and the portion 6 are left integral with and depend from the solid end 1 of the piston.

Formed on each of the cross members 11 and 12 is a bearing portion 17, through which the wrist pin of the connecting rod passes, the wrist pin however being supported from the wrist pin bearings 4 of the respective peripheral supports 3. A tying or connecting member 18 having threaded ends 19 and 20 is horizontally mounted across the hollow of the piston, the end 20 being engaged in the threaded portion 21 formed on one of the wrist pin bearings 4, while the end 19 is engaged in the threaded portion 22 of the member 11, said tying member 18 passing through the enlarged opening 23 of the reinforcing member 12, said member 18 serving to tie one of the supports 3 with the member 11. A second tying member 24 having threaded ends 25 and 26 is arranged parallel to the member 18, the end 25 thereof being engaged in the threaded portion 29 of the member 12, whereas the end 26 is engaged in the threaded portion 27 of the wrist pin bearing 4 which is oppositely disposed from the wrist pin bearing 4 to which one end of the member 18 is secured, said member 24 passing through the enlarged opening 28 which is formed in the reinforcing member 11.

It is to be noted that the diameter across the supports 3 of the piston is less than the diameter of the skirt or cylinder bearing portion which comprises the parts 6, 7 and 8, and in the manufacture of this improved piston the peripheral surface of the skirt portion thereof is made to fit and engage the cylinder wall, whereas the supports 3 of the piston will not engage the cylinder wall.

In the operation of this improved piston when working under the heated conditions of the cylinder, when the supports 3 of the piston which are oppositely disposed tend to move outwardly by expansion of the solid end 1, the tying member 18 will be given an outward pull, and an outward pulling strain will also be given to the tying member 24, consequently said members 18 and 24 on account of being secured at their outer ends to respective wrist pin bearings 4 will receive a pulling strain in opposite directions, and in as much as the inner ends of the members 18 and 24 are connected to respective cross members 11 and 12, which are formed integral with the skirt of the piston, the ends of said cross members 11 and 12 adjacent the vertically inclining slot 10 will be drawn inwardly towards each other, thereby tending to draw the portions 9 of the piston skirt together, and the skirt across any diameter thereof will be held from normal expansion and consequently, the skirt of the piston which forms the cylinder bearing portion will be prevented from too tightly engaging the cylinder wall.

From the aforesaid description it is obvious that a better wearing piston than heretofore is provided, as ordinary pistons by reason of normal expansion under maximum thermal conditions of the cylinders, create scoring friction between the piston skirts and the cylinders.

While I have described one embodiment of my invention with some particularity, obviously many other embodiments thereof will occur to those skilled in the art to which it appertains. I, therefore, do not limit myself to the precise details described, but claim as my invention all variations and modifications coming within the scope of the subjoined claims.

What I claim is:

1. A piston open at one end and having a packing ring supporting portion and a cylinder engaging portion, said cylinder engaging portion being supported from said ring supporting portion from one side thereof, a pair of wrist pin bearings depended from said ring supporting portion, said cylinder engaging portion having a slot cut entirely through the thickness of its peripheral wall and extending from the open end of the piston to said ring supporting portion, said cylinder engaging portion having a pair of transversely extending webs formed integral therewith each being engaged on each side of the slot thereof, and tying means extending from each of said wrist pin bearings to a respective web.

2. A piston comprising a head, a slotted skirt, supports extending from the head, and connecting means extending from each of said supports having a part providing means tending to close the slot of the skirt when the piston is subjected to expansion.

3. A piston comprising a head, a slotted skirt, supports extending from the head, and connecting means affected only by said head and unaffected by any portion of said skirt extending from each of said supports having action on the skirt tending to close the slot thereof.

4. A piston comprising a head having a side wall, a skirt, a rigid part depending from the side wall of the head, a flexible part in the skirt, and connecting means from the rigid part to the flexible part comprising devices mounted within the skirt for preventing normal expanding movement of the flexible part.

5. A piston having a peripheral bearing portion, wrist pin supporting portions separated from said bearing portion, and means connecting said bearing portion with said supporting portions respectively for drawing one portion inwardly when the other moves outwardly by expansion.

6. A piston closed at one end and having a flexible skirt portion, pin bosses depending from said closed end, and instrumentalities interconnecting said bosses and said skirt portion for resolving expansion forces in the closed end into contractive forces in the skirt.

7. A piston having a head, flexible skirt portions, pin bosses depending from opposite sides of the head and disposed to be moved outwardly relative to each other upon expansion of the head, and instrumentalities operable upon such outward movement of the bosses to draw the skirt portions inwardly toward each other.

8. A piston having a head, pin bosses depending from opposite sides of the head and disposed to be moved outwardly relative to each other upon expansion of the head, a flexible skirt portion adjacent each of said bosses, and instrumentalities operatively connecting each boss to the skirt portion adjacent the opposite boss.

9. A piston having a head, a skirt portion rigid with the head, flexible skirt portions, transverse flexible webs connecting said rigid and flexible skirt portions, and means operated by expansion of the head to cause said webs to draw said flexible skirt portions inwardly.

10. A piston comprising a head, pin bosses depended from the head, a flexible skirt, and connecting means from the pin bosses comprising instrumentalities having cooperable connection with the skirt for contracting the skirt as the pin bosses are moved outwardly by expansion of the head.

11. A piston comprising a head, pin bosses depended from the head, a flexible skirt, and connecting means from the pin bosses comprising instrumentalities having cooperable connection with the skirt for preventing outward movement of the skirt as the pin bosses are moved outwardly by expansion of the head.

12. A piston comprising a head, pin bosses depended from the head, a flexible skirt, and a structure connecting the pin bosses to the skirt co-active on the skirt for preventing expanding enlargement thereof as the pin bosses are moved outwardly by expansion of the head.

13. A piston comprising a head, a flexible skirt, pin bosses, and a structure in the skirt cooperably connected to the pin bosses for preventing over expansion of the skirt by the action of the pin bosses as the pin bosses are moved outwardly by expansion of the head.

14. A piston comprising a head, a flexible skirt, pin bosses, and a structure in the skirt cooperably connected to the pin bosses for preventing expanding enlargement of the diameter of the skirt independent of the action of the cylinder wall thereto as the pin bosses are moved outwardly by expansion of the head.

15. A piston having a head, a slotted skirt, pin bearings separated from the skirt, and connecting means extending from the pin bosses to the skirt comprising devices active to move portions of the skirt inward by the pin bosses being moved outwardly by expansion of the head when the piston is subjected to working temperature.

16. A piston comprising a head, a flexible skirt, pin bosses, and means extending from the pin bosses comprising devices cooperable with the skirt and the pin bosses tending to draw in a part of said skirt independent of the action of the cylinder wall thereto as the pin bosses are moved outwardly by expansion of the head.

17. A piston having a head, a resiliently yielding skirt, rigid wrist pin supports, and connecting means from the supports comprising instrumentalities active to prevent normal expansion of the skirt when the supports are moved outwardly under the influence of heat on the head.

18. A piston having a head and a slotted skirt, pin bosses depended from the head and separated from the skirt at the pin boss sides, and connecting means attached to said bosses comprising separate inserted instrumentalities active to move at least a portion of the skirt inward when the piston is subjected to working temperature.

19. A piston having a head, pin bosses depended from the head, a slotted skirt free from engagement with the pin bosses, and means connecting said skirt to said pin bosses comprising devices cooperable to draw portions of said skirt inwardly by expansion of the head when the piston is subjected to working temperature and the piston bosses are thereby moved outwardly.

20. A piston having a head, pin bosses depended from the head, a flexible skirt free from engagement with the pin bosses, and connecting means attached to said bosses comprising instrumentalities active to move a portion of the skirt inward when the pin bosses are moved by expansion of the head.

21. A piston having a head, pin bosses depended from the head, a split skirt free from engagement with the pin bosses, and resiliently yielding means attached to said bosses comprising instrumentalities active to move portions of the skirt inward when the pin bosses are moved by expansion of the head.

22. A piston having a head, a skirt, pin bosses depended from the head, the skirt being separated from the head, except on one side and being free from engagement with the pin bosses and continuous circumferentially beneath said pin bosses, the skirt having a single longitudinal slot therein on the side opposite to its connection with the head, and a pair of connecting members free from engagement with the pin bosses extending from the slotted side to the opposite side of the skirt.

23. A piston having a head, a flexible skirt, pin bosses depended from the head, transverse webs connecting opposing sides of the skirt, and connections from each pin boss to respective webs active to draw said webs towards each other when the piston is subjected to working temperature.

24. A piston having a head, a flexible skirt, pin bosses depended from the head, the skirt being partially separated from the head, and the pin bosses separated from the skirt, transverse webs connecting opposing sides of the skirt, and connections from each pin boss to respective webs active to draw said webs towards each other when the piston is subjected to working temperature.

25. A piston comprising a head, a skirt, pin bosses, said skirt being free of the pin bosses and continuous circumferentially beneath said pin bosses, and transverse webs engaging opposite sides of the skirt, said webs being spaced from the pin bosses.

26. A piston comprising a head, pin bosses connected with the head, a skirt having a single longitudinal slot from its lower to its upper end to provide flexibility, said skirt being continuous circumferentially below the pin bosses, and transversely disposed webs extending across and connecting opposite portions of the skirt adjacent the inner ends of said pin bosses respectively and being unattached to the respective adjacent pin bosses.

ELMER C. LONG.